United States Patent

Hikichi

[11] Patent Number: 5,976,254
[45] Date of Patent: Nov. 2, 1999

[54] COATING DEVICE

[75] Inventor: Toshio Hikichi, Miyagi, Japan

[73] Assignee: Sony Corporation, Tokyo, Japan

[21] Appl. No.: 08/974,344

[22] Filed: Nov. 19, 1997

[30] Foreign Application Priority Data

Nov. 20, 1996 [JP] Japan .................................. 8-324765

[51] Int. Cl.$^6$ .................................................. H01F 1/00
[52] U.S. Cl. ............................ 118/419; 118/410; 427/549
[58] Field of Search ..................................... 427/547–549; 118/410, 419, 50.1

[56] References Cited

U.S. PATENT DOCUMENTS

| | | | |
|---|---|---|---|
| 4,854,262 | 8/1989 | Chino et al. | 118/411 |
| 5,474,814 | 12/1995 | Komatsu et al. | 427/549 |
| 5,633,050 | 5/1997 | Shibata et al. | 427/549 |

FOREIGN PATENT DOCUMENTS 933762  8/1963  United Kingdom ................... 427/549

Primary Examiner—Brenda A. Lamb
Attorney, Agent, or Firm—Hill & Simpson

[57] ABSTRACT

This invention intends to provide a coating device capable of forming, in a good work efficiency, a magnetic layer whose surface is free from irregularities in thickness and is flat. The above object is achieved by providing a device wherein a magnetic paint 3A is coated through an extrusion die 1, and, downstream of the die and close to the non-coated side of a substrate 19, a magnetic field generator 12A with a laminated structure composed of plate-like magnets 15 packed in layers is placed inclined by 45°–85° with respect to the running direction R of the substrate. Through this arrangement, the coated surface of magnetic layer 3 will be free from thickness irregularities and be flattened.

5 Claims, 7 Drawing Sheets

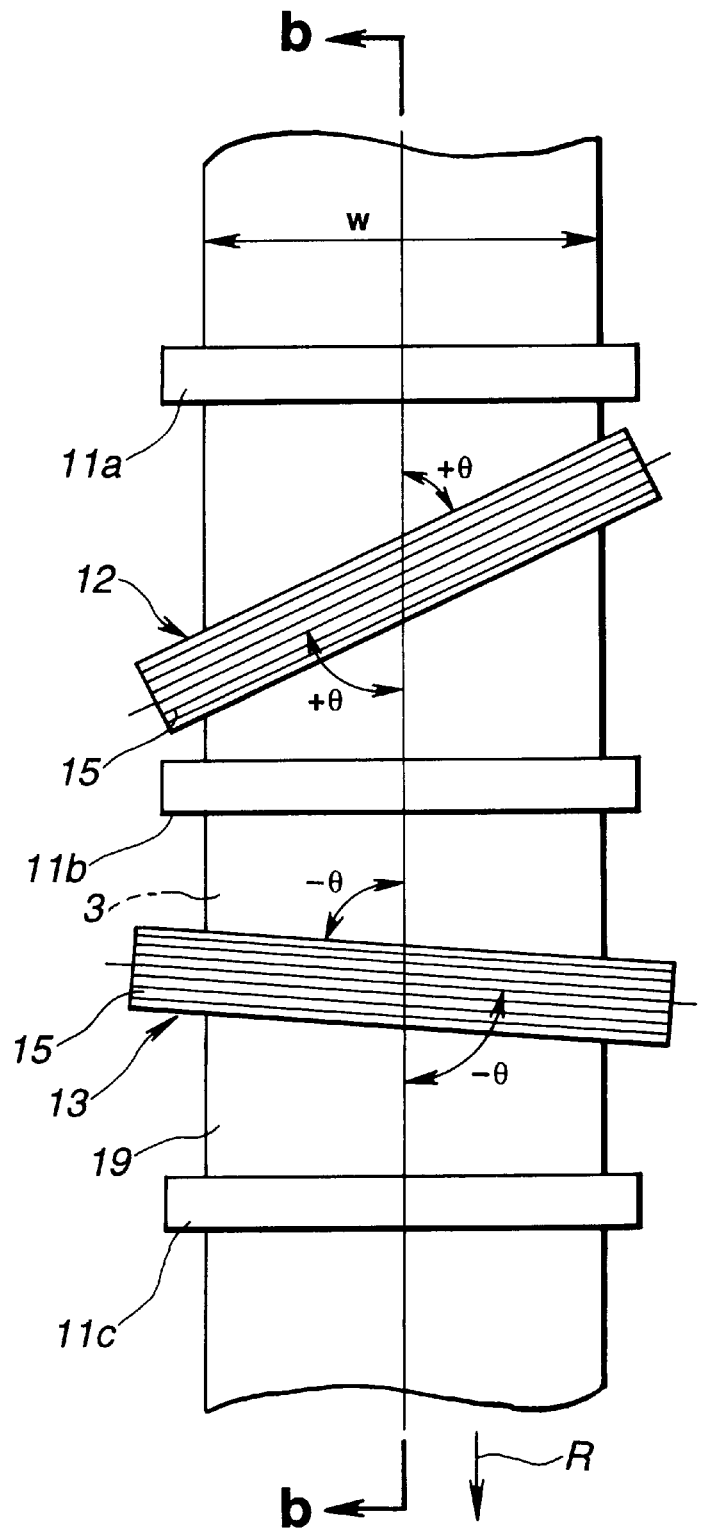 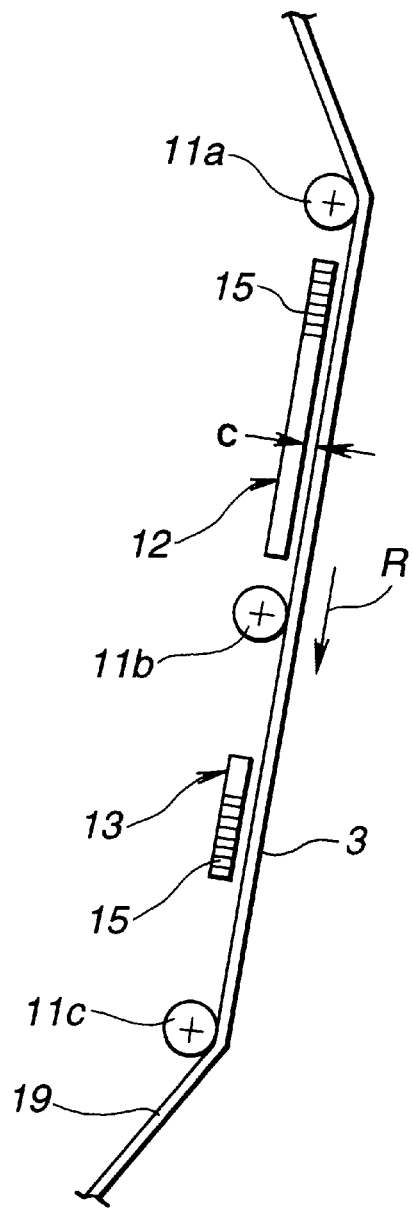
FIG.6A      FIG.6B

COATING DEVICE

BACKGROUND OF THE INVENTION

1. Field of the Invention

This invention relates to a coating device, for example, to a coating device which is suitable for coating a magnetic layer upon a magnetic recording medium to be utilized as audiotapes, videotapes, etc.

2. Description of the Related Art

Recording media used in audio apparatuses, video apparatuses and computer systems include mainly so-called coated type magnetic recording media which are produced after a magnetic powder, a binder and various additives have been dispersed in an organic solvent, and the resultant mass has been kneaded to produce a magnetic paint which has been then coated on a non-magnetic substrate and dried to form a magnetic layer thereupon. This is because of the excellent productivity and wide applicability of such recording media.

The conventional method of coating a magnetic layer consists of gravure coating incorporating a gravure roll, but is often found inadequate in coating speed and in the evenness of coat thickness. To meet such problem, what has been often adopted recently is die coating which incorporates an extrusion die whereby a magnetic paint is extruded through a slit to be coated on a substrate, because this method is advantageous in that it allows the coating speed to be raised while the amount of coated paint and the evenness of resulting coat is kept controlled and maintained.

For the production of the coated type magnetic recording medium, to improve the magnetoelectric conversion of the product, it is customary to submit, after a magnetic paint has been coated on a non-magnetic substrate, the resulting coated substrate which is still wet, to a surface smoothing treatment. If the surface of magnetic layer formed on a non-magnetic substrate does not have a sufficient surface property, particularly if the coated film has an uneven thickness owing to faulty coating, the resulting recording medium will give an inadequate signal recording capability. To avoid such inadequacy, a technique has been generally known in which a bar smoother to act as a surface smoothing means is allowed to contact mechanically with the coated surface to smoothen that surface.

Particularly, with the above described die coating incorporating an extrusion die, coating is performed while the die is kept immobilized, and thus surface roughness consisting of minute longitudinal lines in the direction along which the non-magnetic substrate runs easily develops on the surface of the coated layer. The severity of this surface roughness depends on the magnitude of shearing force the paint receives at the coating unit, and is larger with the die contact coating where die is allowed to contact with the substrate than with the die lift coating where die does not contact with the substrate. Moreover, surface roughness tends to develop more easily as the magnetic powder becomes more fine to make the resultant magnetic recording medium more suitable for a high density recording, because the fineness of powder encourages the aggregation of the resulting paint. These effects are more manifest with die coating.

For a conventional die coating to be free from such flaws as described above, it is necessary (particularly with the die lift coating) to combine the die and bar smoother appropriately so that the surface of coated layer may be flawlessly smoothened.

Still, smoothing a coated layer with a bar smoother has following three problems and remains to be further improved.

(1) If a foreign substance(s) is captured by the smoother which is in contact with a magnetic paint, it may cause a line to form on the coated magnetic layer.

(2) Each time coating is completed and the smoother is wound into a roll, it will be necessary to clean the surface of bar, which will reduce the workability of the device.

(3) Both margins of a substrate will face the edges of smoother where paint may be not present, and receive scratches from the bare edges, or will easily suffer deteriorated coating owing to the paint mass which has been dried and adhered to the bar.

To replace such conventional bar smoother, Japanese Patent Laid-Open No. 60-202542 disclosed a technique which consists of placing a smoother incorporating magnets downstream of the roller to coat a magnetic paint. The use of such a smoother with magnets seems, on outlook, to achieve complete smoothening of the surface coated with a magnetic paint, but, in reality, smoothening is inadequate with this method because the method consists simply of moving the magnets normal to the direction along which a substrate runs. Therefore, the surface smoothness of the magnetic layer is not improved by this method. In addition, with this method, a magnetic paint is coated with a roll, and thus the coating speed is slow as discussed above, and furthermore the evenness of coat surface is readily impaired.

SUMMARY OF THE INVENTION

With above situations as a background, this invention has been proposed, and it intends to solve above problems inherent to conventional smoothers, and to provide a coating device which will allow a high speed formation of a coat whose surface is flat and free from fluctuations of thickness.

The present inventors have strenuously studied the problems inherent to the above-described conventional techniques, and achieved the present invention of a coating device which will allow a coated film to be free from lines on its coated surface and irregularities in coat thickness on both margins, and be excellent in workability. This invention was based on the finding that, with extrusion die coating wherein a magnetic paint is extruded through a slit to be applied onto a substrate (flexible support) running continuously, a magnet unit which includes a specific number of permanent magnet elements each having an N and S poles with those N and S poles alternately arranged in layers in the running direction of the substrate, to give a plate-like structure, and that magnetic unit is placed beneath the non-coated side of substrate whose coated film has been just formed and still wet and prior to magnetization, such that its long axis is inclined by a specific angle with respect to the running direction of substrate.

This invention relates to a coating device which includes an extrusion die which allows a magnetic paint to be extruded so as to be coated onto a substrate running continuously, and a smoother which smoothens, through the action of a magnetic field, the surface of substrate coated with a magnetic paint which has just been formed in the manner as described above and still wet. The smoother has a laminated structure composed of a plurality of magnetic elements placed in layers such that their N and S poles are alternately arranged in the running direction of substrate, and it is placed in a plane parallel and facing the side opposite to the coated surface of substrate with an oblique angle to the running direction of substrate.

According to the coating device of this invention, a magnetic material is extruded with an extrusion die onto a substrate to be coated there, and a smoother with a laminated structure composed of a plurality of magnetic elements arranged in layers which is placed with an oblique angle with respect to the running direction of substrate, smoothens the coated surface which has just been formed and still wet through the action of a magnetic field. To put it more specifically, as the action from the magnetic field (magnetic flux) generated by the smoother has an oblique angle with respect to the running direction of substrate, the coated and yet wet magnetic material will flow in the direction along which the magnetic field acts, and this flow of magnetic material will contribute to the flattening (smoothening) of the coated film of the magnetic material not only in the running direction of substrate but also in the direction normal to the running direction or in the direction of width of substrate. This device of this invention, being capable of smoothening the coated surface in the manner as described above, makes the most of the advantage of high speed coating inherent to extrusion die coating.

BRIEF DESCRIPTION OF THE DRAWINGS

FIG. 6 illustrates the smoother unit of the coating device according to the second example of this invention: 6A gives a flat view and 6B a sectional view along the line b—b of the inset FIG. 6A.

DESCRIPTION OF THE PREFERRED EMBODIMENTS

With the coating device of this invention, the smoother with a laminated structure composed of a plurality of magnetic elements as described above should be preferably placed with an oblique angle ±(45°–85°) with respect to the running direction of substrate. If the smoother is placed with an angle outside above range, the action from the magnetic field generated by the laminated magnetic elements will become so weak that the flow of magnetic coat on the substrate will be reduced and thus smoothening of the coat will become difficult.

When the smoother composed of a plurality of magnetic elements arranged in layers includes a first and second laminated magnetic structures which are sequentially placed beneath a running substrate, their inclined angles with respect to the running direction of substrate should preferably be within the above range or ±(45°–85°), and different from each other.

Preferably, 20–100 plate-like magnetic elements should be arranged in layers to form the smoother.

To form the smoother, the magnetic element should preferably be a permanent magnet, but electrical magnets may be used instead.

The effect of this invention will become more manifest when the magnetic material is applied onto the substrate while the extrusion die and the substrate are kept apart from each other, avoiding direct contact.

EXAMPLE

Examples of this invention will be described below, but, needless to say, the scope of this invention is not limited to the examples mentioned below.

Figure 1:
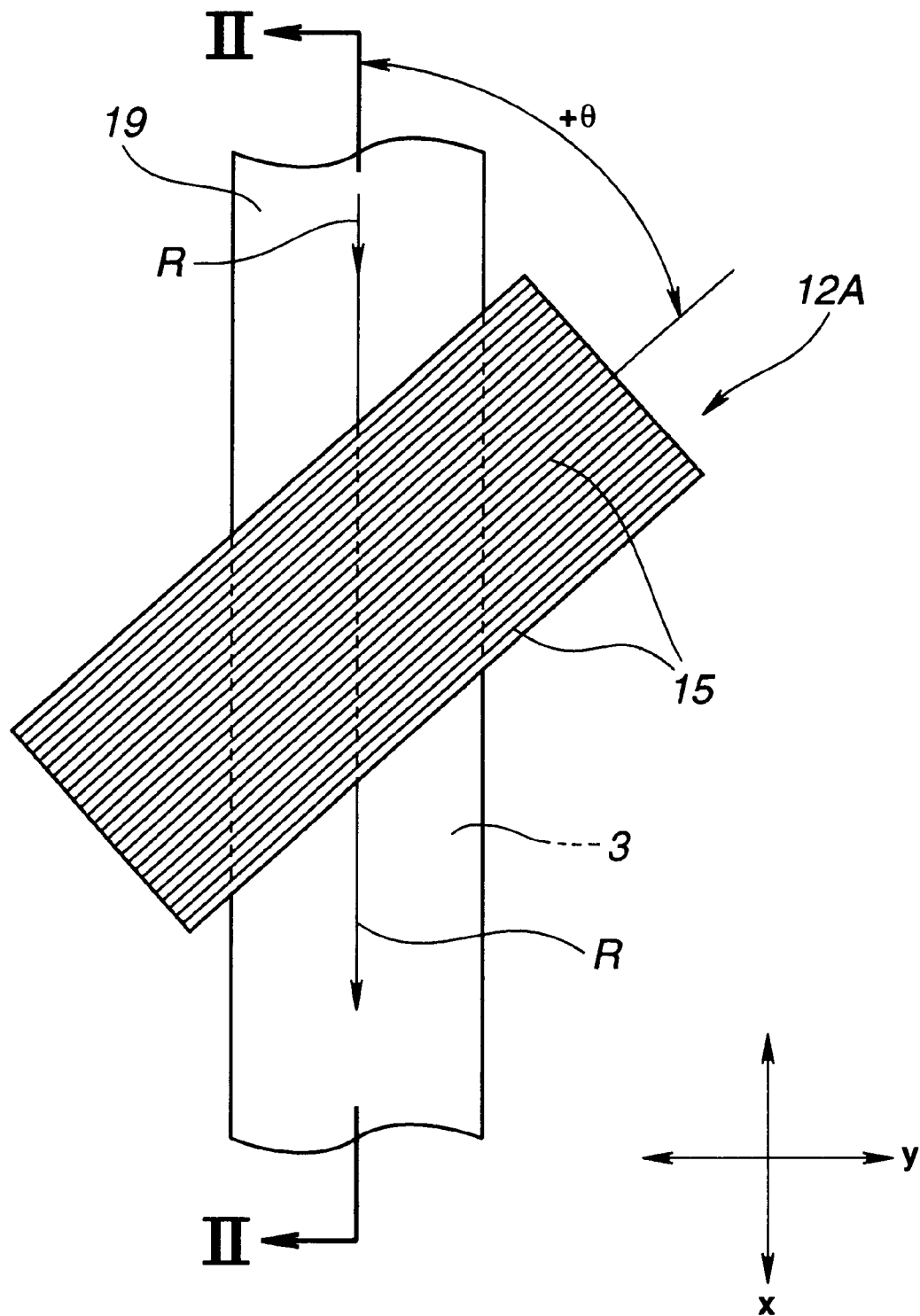
FIG. 1 gives a flat view of the smoother unit schematically drawn of the coating device of the first example of this invention.
Figure 2:
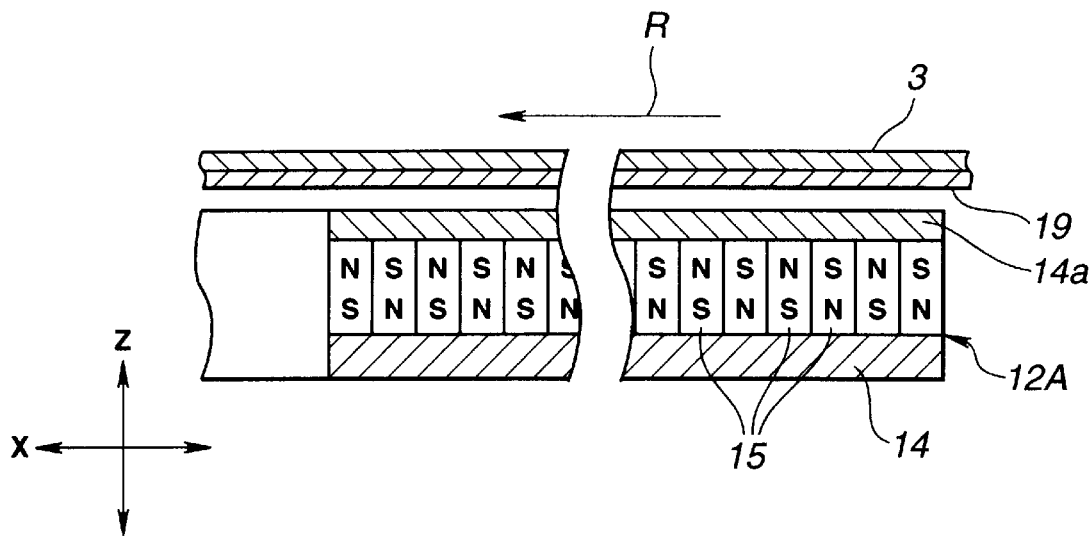
FIG. 2 gives a sectional view of the same unit cut along the line II—II in FIG. 1.
Figure 3:
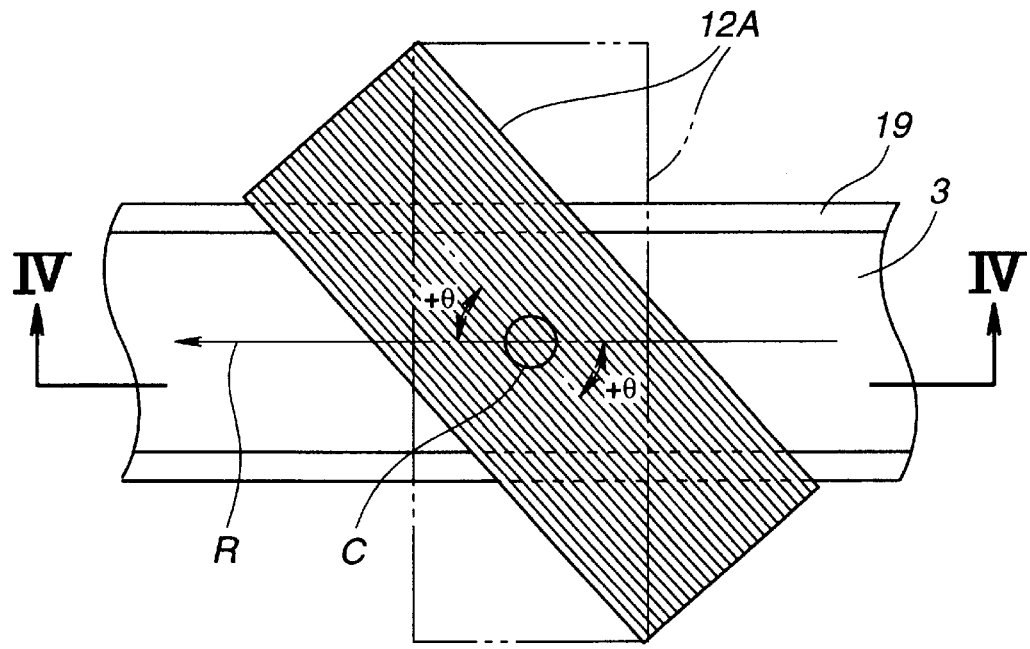
FIG. 3 gives a flat view of the smoother unit schematically drawn which indicates within what angles the magnetic field generator of the coating device can be varied in position (the position of the smoother unit relative to the substrate in FIG. 1 is rotated by 90 in this figure.)
Figure 4:
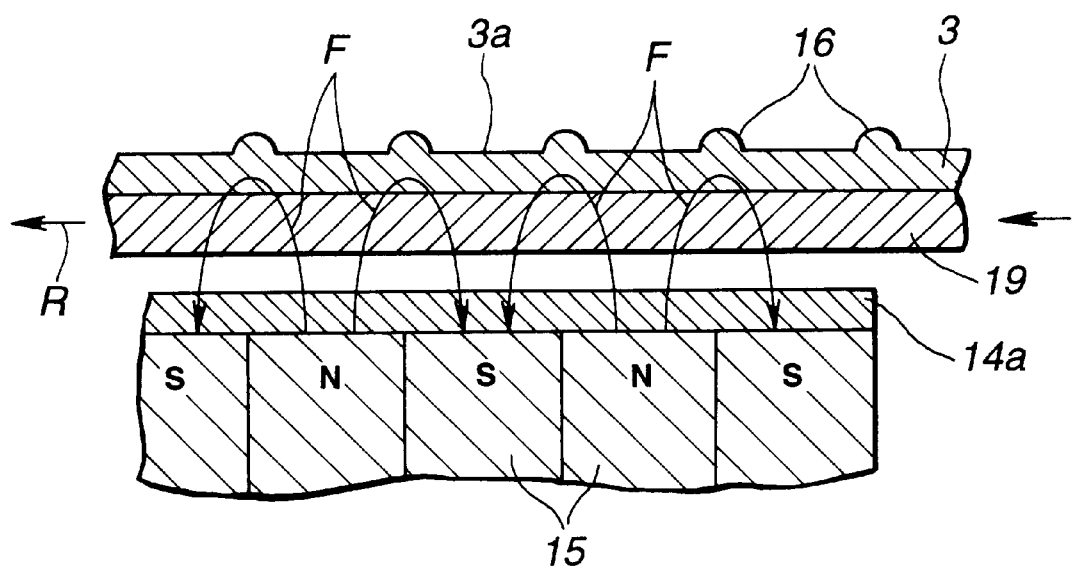
FIG. 4 gives an enlarged sectional view of the smoother unit cut along the line IV—IV in FIG. 3, which indicates phenomena associated with the action of magnetic fluxes.

FIG. 1 gives a flat view of the smoother unit schematically drawn of the coating device of the first example of this invention. FIGS. 2–4 gives the constitution of the smoother unit of this example, phenomena observed during the operation of the unit, and the theory explaining the operation.

FIG. 1 shows a magnetic field generator 12A which, being put downstream of the coating unit to eject a magnetic paint (illustration thereof is omitted from the figure), is placed, with respect to a substrate 19, in a plane nearly parallel to the non-coated side thereof and apart therefrom. The substrate 19 has the magnetic paint applied with an extrusion die described below, and, carrying a still wet magnetic layer 3 formed thereupon, runs in the direction designated as R (or in the direction of x-axis.)

The magnetic field generator 12A to constitute a component of the magnetic smoother, includes 20–100 or, more specifically, 50 permanent magnetic elements 15 each shaped into a plate-like structure being arranged in layers along the running direction R of substrate 19. The magnetic field generator 12A is placed with respect to the running direction R such that its long axis is inclined with an angle of +θ (for example 45°). Here the clockwise inclination is expressed by +θ while the counterclockwise inclination by −θ.

The magnetic field generator 12A includes, for example, 50 permanent magnetic elements 15 (which may be referred to as magnets hereinafter) made of a neodymium alloy (whose maximum energy product is 46 MGOe) and arranged in layers. Those magnetic elements, as shown in FIG. 2 (which gives a sectional view of the magnetic field generator cut at the line II—II of FIG. 1), are so arranged to each other that the S and N poles of adjacent magnetic elements are placed alternately in the direction R, their rear sides are fixed with a yoke 14, and their front surfaces (the side facing the substrate 19) are covered with a protective film 14a. The protective film 14a comes into close contact with the substrate 19, or is placed by a few millimeters or less apart from the substrate 19, and is approximately parallel to the substrate in the direction of x-axis and y-axis.

In addition, as shown in FIG. 3, the magnetic field generator 12A may be reversibly rotated so that its long axis moves from the position as represented by the imaginary line where the long axis is normal to the running direction R of substrate 19, to the position as represented by the solid line where the long axis is inclined with an angle of θ, and further the inclined angle may be adjustable.

In the manner as described above, plate-like magnets 15 are placed side by side in multiple layers, and then from these magnets 15, as shown in FIG. 4, are radiated magnetic fluxes F in the direction B normal to contact lines (in the same direction with A of FIG. 3) which are formed between adjacent magnets 15. These magnetic fluxes F act through the substrate 19 on the magnetic paint 3 which has been coated on the opposite side. As a result, the magnetic paint 3 which has been just formed and is still wet is, due to the magnetic attractive force of magnetic fluxes F radiated by the magnetic field generator 12A, displaced towards the areas (the contact areas of two adjacent magnets) between adjacent magnets 15 where the maximum magnetic flux density is present, to form elevations there. Thus, paint beads 16 are formed on the coated surface 3a.

The beads 16 are generated in the form of a continuous line of convex elevation in profile in the same direction with the magnetic field generator 12A, or, for example, 45° with respect to the running direction R of substrate, that is, in the direction R along which run the contact lines between adjacent magnets. These beads 16 contribute to the smoothening of coated surface because, with the running of the substrate 19, they would behave as if they were toppling down to move on the coated surface of the substrate.

Although, during this process, minute lines of indentations and elevations appear on the coated surface, the elevated portions will fall into the indented portions, and the same process will repeat itself for each pair of adjacent magnets. Thus, it is possible to achieve a smoothening of the whole coated surface of substrate in the direction of width as well as in the running direction.

To achieve the complete flattening, it is important for the magnetic field generator 12A to be placed with an oblique angle of ±(45°–85°) with respect to the running direction of substrate 19. Various experimental results have shown that placing the magnetic field generator 12A with an oblique angle within above range is necessary for the thorough smoothening of a wet surface coated with a magnetic paint 3A.

The smoother of this example is most effective when it coats a magnetic paint through an extrusion die, particularly through a magnetic extrusion die (to be referred to as die hereinafter.)

The coating with this die can take place in two different ways: one is die lift coating which consists of coating a paint with the die and substrate being kept apart from each other, and the other is die contact coating which consists of coating a paint with the die and substrate being put into close contact to each other. The present coating can be adapted to either of the two, but as surface roughness in the form of minute streaks may easily develop on the coated surface prepared by die lift coating, the smoother with above constitution may be all the more effective for die lift coating. In the case of die contact coating, the contact of die with the substrate surface during coating may give an appreciable smoothing of that surface.

Figure 5:
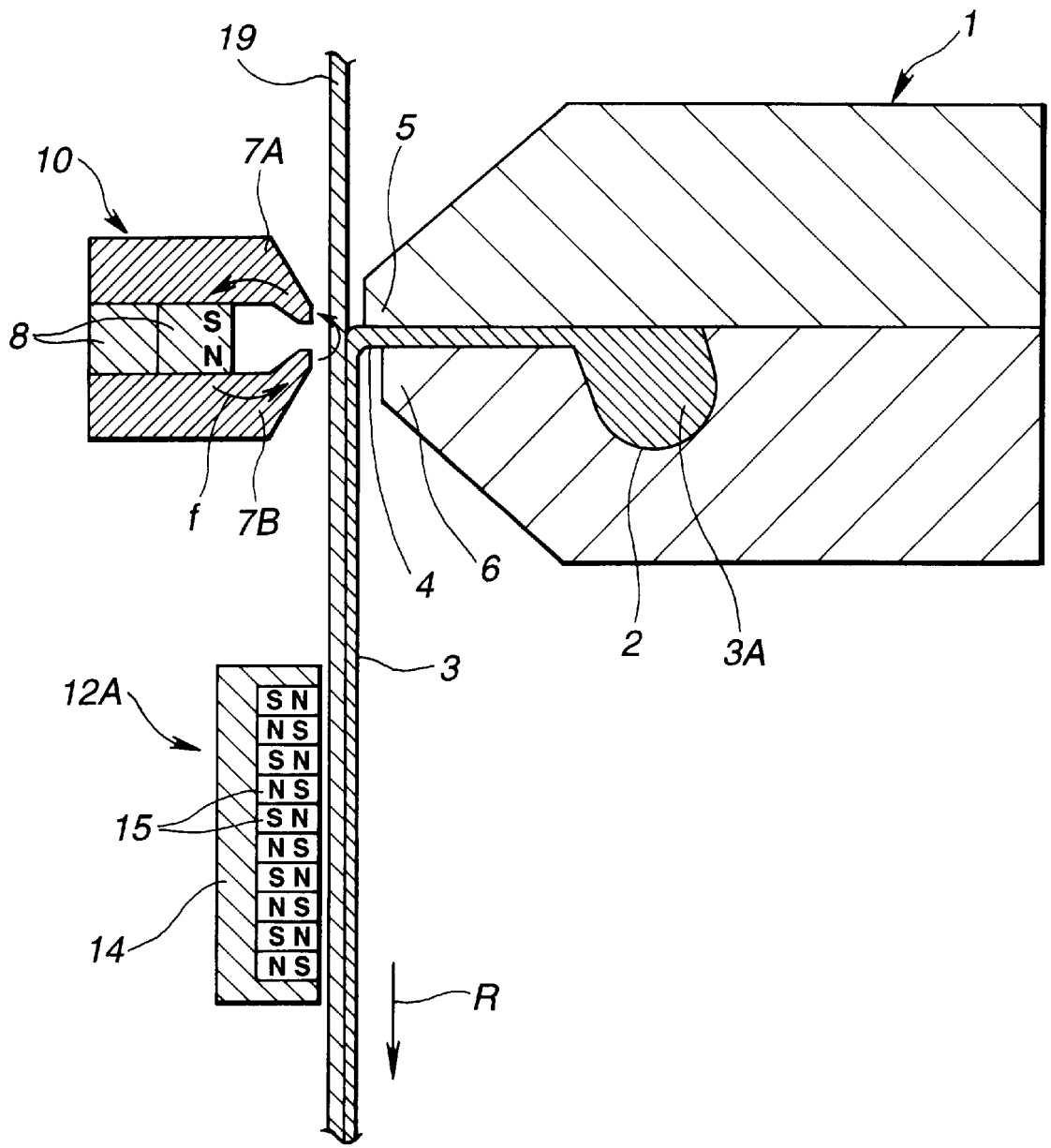
FIG. 5 gives a sectional view of the same coating device schematically drawn with an emphasis on the coating unit and the smoother unit to execute coating by die lift coating.

FIG. 5 gives a sectional view of parts of interest schematically drawn when a non-contact type extrusion die is used.

A die 1, as shown in the figure, is allowed to have a slit of 160 mm wide after a front and back lips 5 and 6 have been adjusted appropriately, and the back lip 6 has a pocket 2 which acts as a reservoir to store paint. A slit 4 (the width for coating is, for example, 110 mm and the slit gap is, for example, 260 μm) is formed between the pocket 2 and an ejection mouth, and the paint 3A is ejected through this slit 4.

A magnetic field generator 10 is placed opposite, with a gap of a specific width, to the die 1. This magnetic field generator 10 includes a magnet 8 (the magnet in the figure is a permanent magnet made of a neodymium alloy but an electrical magnet may be used instead) inserted between two yokes 7A and 7B made of low carbon steel equivalent to S20C which forms a closed magnetic circuit (the magnetic force at the tip has the maximum flux density of 3800 G when actually measured.)

A substrate 19 upon which a film is to be coated, and made of PET (polyethylene telephthalate) for VHS (its width, for example, is 127 mm and thickness, for example, is 14.5 μm) runs through the gap between the die 1 and magnetic field generator 10, without contacting with any of the two elements as shown in FIG. 5, and receives a coat of magnetic paint 3A, while being carried in the vertical direction.

The magnetic paint 3A is supplied with a pump not illustrated here into the pocket 2 at a rate sufficient to give a coat whose dry thickness, for example, is 1–2 μm upon a substrate which is carried by a tension of, for example, 3 kg/width and at a speed of, for example, 400 m/min. The smoother unit including the above-described magnetic field generator 12A is placed downstream of and close to the die 1 for coating.

Through the operation of these elements, on one surface of the substrate 19, a magnetic film 3 is formed whose surface has been smoothened.

With the coating device of this invention, as described above, the magnetic field generator 10 is placed opposite to the die 1 with the substrate 19 inserted in between, and, through the action of magnetic fluxes f radiated through the yokes 7A and 7B from the magnet 8, the magnetic paint 3A ejected from the die 1 is drawn towards the surface of substrate 9 as if attracted by the magnetic field generator 10, to be coated there. Thus, the adherence of coat is excellent, and the paint 3A will not drop during coating.

In the manner as described above, the magnetic paint 3A can be coated on the substrate 19, smoothened, and dried, and the resulting coated sheet is cut into strips with a specific width, to produce magnetic tapes each of which includes a strip of non-magnetic substrate with a magnetic layer 3 formed thereupon. Further, the surface of the substrate opposite to the magnetic coat surface may have a back coat layer, and the magnetic layer may have an overcoat layer thereupon. The surfaces of substrate may have an intermediate layer or basement layer to improve the adherence of magnetic layer onto the substrate.

For a magnetic recording medium such as a magnetic tape to be prepared according to this invention, magnetic powder to be used as a material of the magnetic paint (or of the magnetic layer) may include any such powder publicly known, and may include oxidized magnetic powders or metal magnetic powders.

The oxidized magnetic powder may include, for example, $\gamma$-$Fe_2O_3$, Co containing $\gamma$-$Fe_2O_3$, $Fe_3O_4$, Co containing $Fe_3O_4$, Co coated $\gamma$-$Fe_2O_3$, Co coated $Fe_3O_4$, $CrO_2$, etc.

The metal magnetic powder may include, for example, Fe, Co, Ni, Fe—Co, Fe—Ni, Fe—Co—Ni, Co—Ni, Fe—Co—B, Fe—Co—Cr—B, Mn—Bi, Mn—Al, Fe—Co—V, etc., and, to improve various properties characteristic with those materials, thereto may be added a metal component such as Al, Si, Ti, Cr, Mn, Cu, Zn, etc. Hexagonal ferrite such as barium ferrite or iron carbide such as $Fe_5C_2$ and iron nitride may be also used.

The other composite elements necessary for the production of a magnetic recording medium according to this invention may include any publicly known elements which are used for similar purposes when a conventional coated type magnetic recording medium is prepared.

For example, the binder which may be added to a magnetic layer may include degenerated or non-degenerated vinyl chloride resins, vinyl copolymers such as copolymers of vinyl acetate, polyurethane resins such as polyester polyurethane resins, polycarbonate polyurethane resins, etc., or polyester resins alone or in combination. In addition, fibril resins such as nitrocellulose, etc., thermoplastic resins such as phenoxy resins or resins permitting a characteristic usage, thermosetting resins, reactive resins and resins which set when exposed to electron beams may be used as an additive.

The groups to be introduced for the degeneration of the resins described above may include —$SO_3M$, —$OSO_3M$, —COOM, —$PO(OM')_2$, etc. (where M represents alkali metal atoms such as Na, etc., and M' represents alkali metal atoms or alkyl group.)

To the magnetic layer, in addition to the magnetic powder and binder, may be added as appropriate an additive(s) such as a lubricant(s), abrasive(s) or antistatic agent(s). These additives may include any publicly known materials which have been used for the same purposes, and are not limited to any specific materials.

Further, to the magnetic layer, may be added as appropriate a dispersant such as lecithin, an antistatic such as carbon black, an abrasive such as alumina, and an anticorrosive. These dispersants, antistatistics, abrasives, and anticorrosives may include any publicly known materials which have been used for the same purposes, and are not limited to any specific materials.

Furthermore, the magnetic layer is usually formed on a substrate, and the usable substrate may include, in addition to polyethylene telephthalate, polyesters such as polyethylene-2,6-naphthalate, etc., polyolefins such as polyethylene, polypropylene, etc., cellulose derivatives such as cellulose triacetate, cellulose diacetate, cellulose buthylate, etc., vinyl resins such as polyvinyl chloride, polyvinylidene chloride, etc., and plastics such as polyamide, polyamide imide, polycarbonate, etc.

To form a magnetic layer on a non-magnetic substrate, the magnetic powder is combined with a binder, a lubricant, an organic solvent and various other additives to give a magnetic paint, and the magnetic paint is coated on the non-magnetic substrate. The back coat layer or top coat layer which may be added as appropriate can be prepared from any conventional materials and by any conventional methods.

FIG. 6 gives the smoother unit of a coating device belonging to Example 2 of this invention. FIG. 6A gives its flat view, while FIG. 6B a sectional view of the same unit cut along the line b—b in FIG. 6A. This gives a view corresponding to that in FIG. 1.

As shown in the figure, in this example, a magnetic field generator 12 which appears first when seen from the position of a coating unit is placed in series ahead of a second magnetic field generator 13 which is placed downstream of the former. In this example, each magnetic field generator includes permanent magnets 15 in the form of flat plates similar to those of Example 1 described above being packed side by side into, for example, a 25 layered structure. The first magnetic field generator 12 is rotated clockwise to have an oblique angle of $+\theta=65°$ with respect to the running direction R of a substrate 19, while the second magnetic field generator 13 is rotated counterclockwise to have an oblique angle of $-\theta=85°$.

In addition, the smoother of this example is suitable for mass production, and allows the running-through of a substrate having a width W of, for example, 620 mm, being stretched by a force of, for example, 12 kg , at a speed of, for example, 400–900 m/min.

The first magnetic field generator 12 is placed between guide rollers 11a and 11b, while the second magnetic field generator 13 between guide rollers 11b and 11c, and those magnetic field generators and the non-coated surface of substrate 19 are placed nearly in parallel to each other to form a gap C of a constant width of, for example, 0.5 mm or less.

It is important here for the first and second magnetic field generators 12 and 13 to have their oblique angles with respect to the running direction of substrate 19 within the range of $\pm(45°–85°)$ various experimental results have shown that, when their oblique angles are allowed to be within the above range, the surface coated with the magnetic paint 3A and being still wet can be smoothened satisfactorily with no lines and irregularities on both margins of substrate, and thus coating can be performed with a good work efficiency.

Figure 7:
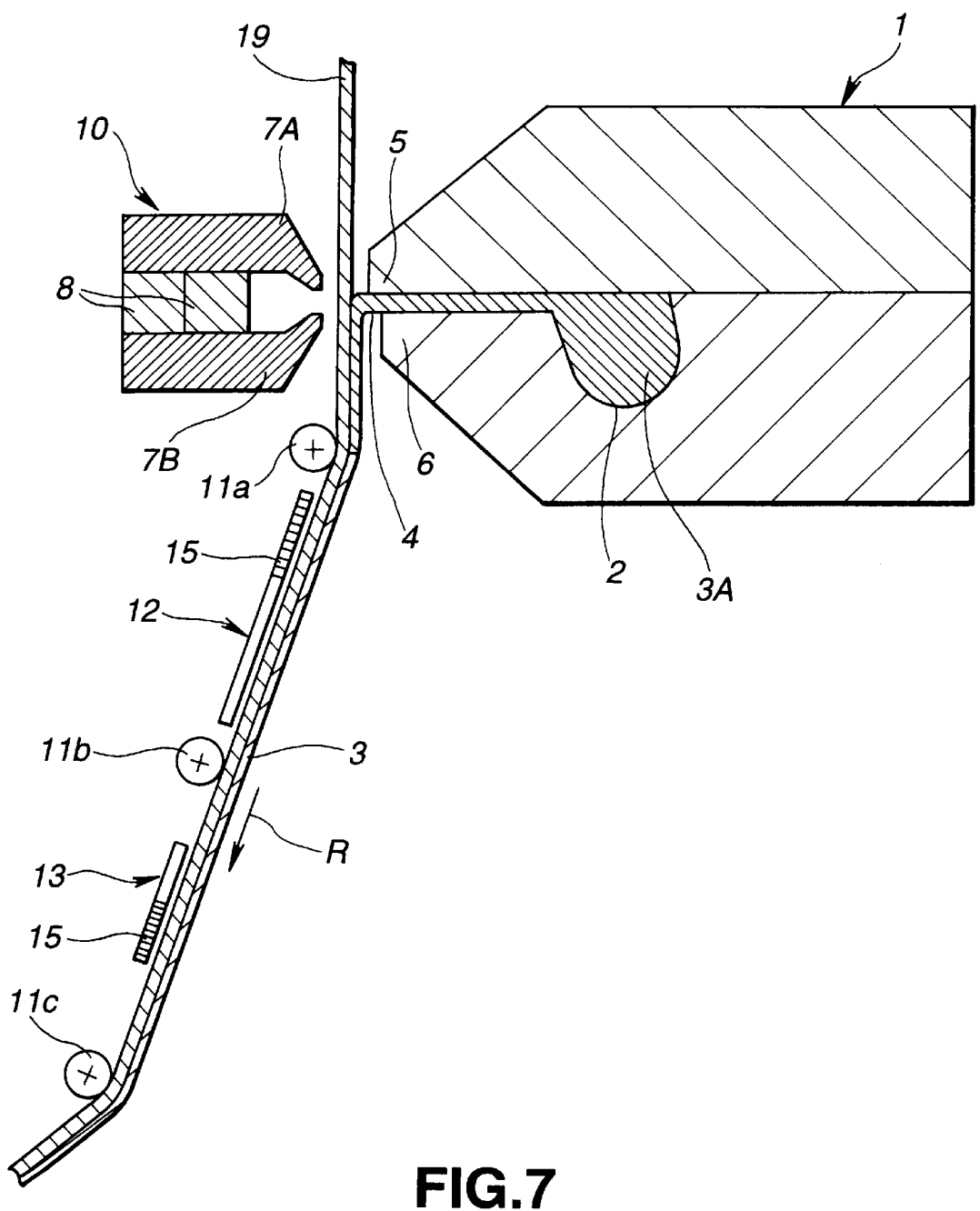
FIG. 7 gives a sectional view of the same coating device schematically drawn with an emphasis on the coating and smoother units.

FIG. 7 gives a sectional view of the important elements including a die 1 and a magnetic field generator 10 of a coating device which practices the coating method of this example.

The coating device of this example is allowed to have a bigger size than the above described device of Example 1. Thus, the die has a width as large as, for example, 700 mm which allows a coating as wide as, for example, 610 mm. The structure and operation of the die 1 and magnetic field generator 10 are the same as in Example 1, and their explanation will be omitted here.

In this example, immediately after a magnetic paint has been coated with the die 1, the surface 3a of a magnetic layer 3 which has been measurably smoothened with the first magnetic field generator 12 is further smoothened with the second magnetic field generator 13 which has been rotated in such a way as to give an oblique angle opposite to that of the first magnetic field generator 12.

To put it more in detail, beads 16 as shown in FIG. 4 receive magnetic fluxes opposite in direction from the first and second magnetic field generators 12 and 13, and thus the flow of liquid magnetic paint takes place in various directions on the surface of substrate 19 which may further encourage the smoothening of the coat. The above-described feature characteristic with the plurality of magnetic field generators 12 and 13 used in combination will allow the thorough smoothening of a magnetic coat even on a substrate which, owing to its characteristics, or to the magnetic or viscous properties of the magnetic paint to be coated thereupon, will not allow a sufficient smoothening when it is subject to a coating device incorporating only a single magnetic field generator 12A as shown in FIG. 1.

Next, cases where the devices of above examples were actually applied for magnetic coating will be described below.

Figure 8:
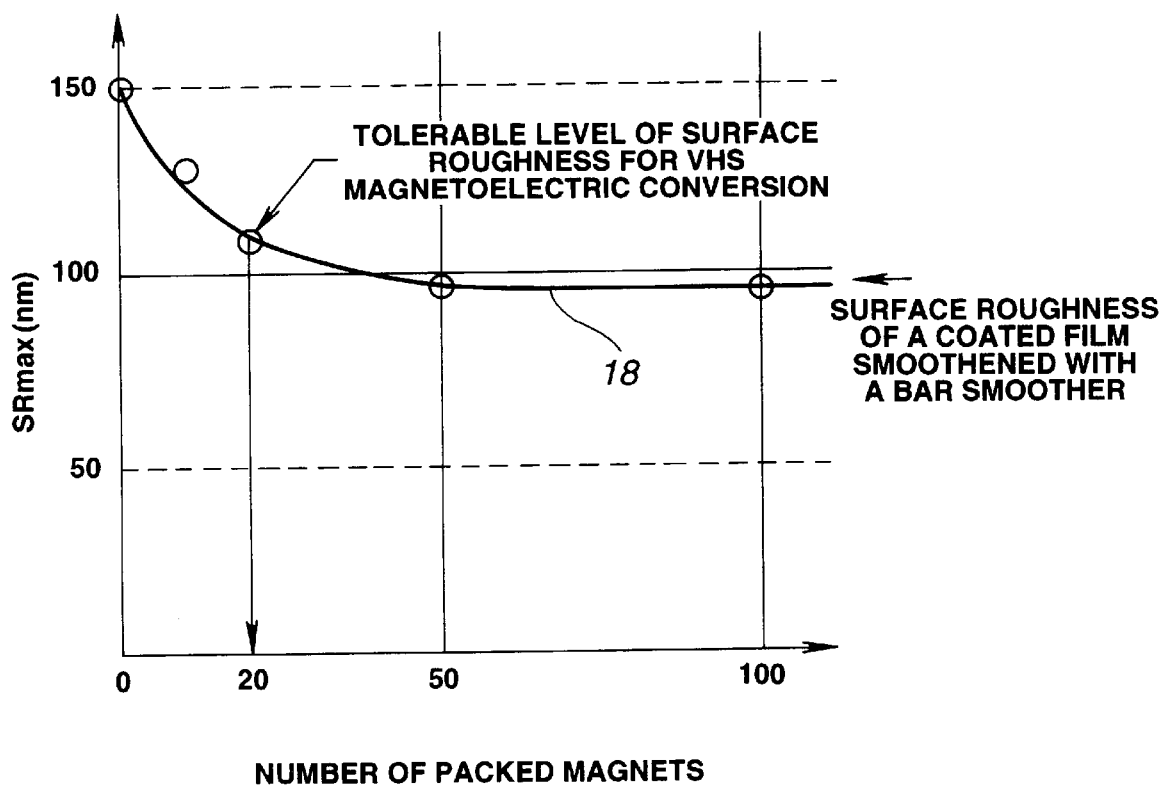
FIG. 8 gives a graph indicating the maximum roughness of coated surface as a function of the number of magnetic elements.

FIG. 8 gives a graph indicating the maximum surface roughness (SRmax) of a magnetic layer 3 formed by coating on a substrate, as a function of the number of plate-like magnets which constitute the magnetic field generator 12A of Example 1 (whose oblique angle θ with respect to the running direction of substrate is +45°.)

In contrast with the maximum surface roughness (150 nm) of a magnetic coat which has been prepared with a device with no magnetic appliance, the tolerable level of surface roughness (about 110 nm) to be applicable for VHS magnetoelectric conversion can be achieved only by a magnetic coat prepared with a coating device incorporating 20 flat magnets in layers. Further, when the number of magnets is increased up to 50, the maximum surface roughness of the resulting coat is further reduced down to about 96 nm, and when the number of magnets is further increased, the surface roughness becomes nearly as good as the level of a magnetic coat which has been prepared with a device incorporating a bar smoother as described above, but when the number of magnets is still further increased, no appreciable change is observed. These are the tendencies recognized from the inspection of curve 18. From above, the number of laminated magnets is preferably 20 or more, and 100 or less practically.

From the results in FIG. 8, the maximum surface roughness of a magnetic coat prepared with a device incorporating 50 magnets in layers is about 96 nm, and this is nearly equal to the surface roughness of a magnetic coat prepared with a device incorporating a bar smoother which has been thought as the most excellent of all conventional techniques for smoothening a magnetic coat. This fact demonstrates that the technique of Example 1 for smoothening a magnetic coat is nearly equal in performance to that of the bar smoother, and this is why the device of Example 1 has 50 magnets packed in layers. This also applies for the device of Example 2, and for this type of device, two magnetic field generators preferably have a total of 50 magnets packed in layers (preferably 25 magnets for each generator.)

The coating in above examples was performed under the conditions specified in Table 1 described below.

TABLE 1A (coating unit)

| Classification | Item | First example | Second example |
|---|---|---|---|
| Die 1 | Coating method | Non-contact extrusion coating | |
| | Die width | 160 mm | 700 mm |
| | Coating width | 110 mm | 610 mm |
| | Slit gap | 260 μm | 260 μm |
| Magnetic field generator 10 | Magnet 8 | Neodymium alloy magnet (30 MGOe) | |
| | Yoke 7A, 7B | Material: low carbon steel (S20C) | |
| | | Magnetic force: 3800 Gauss at yoke tip | |
| Magnetic paint 3A | | Paint for VHS (magnetic powder: Fe and Fe compounds) | |
| | | Binder: vinyl chloride polymers, polyurethane | |
| | | Filler: alumina or the like | |
| Substrate 19 | | Polyethylene telephthalate substrate for VHS | |
| Coating condition | Width | 127 mm | 620 mm |
| | Thickness | 14.5 μm | 14.5 μm |
| | Tension applied to substrate | 3 kg | 12 kg |
| | Running speed | 400 m/min | 400–900 m/min |
| | Gap between substrate and die | 1 mm | 1 mm |
| | Gap between substrate and yoke | 0.5 mm | 0.5 mm |

TABLE 1B (magnet field generator to smoothen a coated surface (magnet smoother))

| Classification | Item | First example | Second example |
|---|---|---|---|
| | Magnet 15 | Neodymium alloy magnet (46 MGOe) | |
| | Effective width of magnet force | 300 mm | 850 mm |
| | Number of magnets in layers | One unit with 50 layers | two units with 25 layers each |
| Mounting condition | Angle θ with respect to the running direction of substrate | +90°, +45° | First magnetic field generator 12: +65° |
| | | | Second magnetic field generator 13: −85° |
| | Position | Beneath the back surface (non-coated surface) of substrate with a gap of 0–0.5 mm, and may contact with the back surface during coating while the substrate runs. | |

In those experimental cases, various properties were measured each time the magnetic field generator was varied in its angle with respect to the running direction of substrate, and the same measurements were also made on substrates which had been treated with a device incorporating a bar smoother or the device which has been generally thought as best in performance, and on substrates which had received no smoothening treatment. The results are listed in Table 2 below (to see video performance, a coated tape for VHS was used as a reference.)

TABLE 2

| | | Item/sample | | | | |
|---|---|---|---|---|---|---|
| | | 1 Magnet angle 90° | 2 Magnet angle 45° | 3 Magnet angle (+65°, −85°) | 4 Bar smoother | 5 No smoothening treatment |
| RF-OUT | (dB) | −1.1 | −0.8 | −0.7 | −0.6 | −2.3 |
| SRmax (TD) | (nm) | 128.75 | 96.25 | 95.32 | 95.0 | 151.25 |
| SRz (TD) | (nm) | 101.25 | 81.25 | 80.14 | 79.25 | 117.0 |
| SRa (TD) | (nm) | 7.3728 | 6.9324 | 6.2250 | 5.8210 | 13.3004 |

From above results of measurement, it is readily appreciable that, when the magnetic field generator is inclined by +45° or +65° to −85° with respect to the running direction of substrate, the resulting tape shows far better characteristics than the tape which has been subject to the smoother where the same generator had been placed normal to the running direction of substrate, and the tape receiving no smoothening treatment, and further that it has the same smooth surface as that from a bar smoother which has been thought as the best smoother.

From above results, the devices of those examples will ensure following remarkable effects.

(1) The surface coat is improved in smoothness, and the quality standards of products are stably maintained.

(2) No lines develop on the surface and the high quality of products is stably maintained.

(3) No cracks are present on both margins that may receive no coat thereupon, and the possibilities of lines and irregular coats are eradicated.

(4) Cleaning can be dispensed with even after the device is wound into a roll, which allows uninterrupted operations of the same device (which will contribute to the reduction of works necessary for coating.)

As seen from above, according to this invention, to an extrusion die to coat a magnetic layer for the production of magnetic tapes is added a magnetic unit to smoothen a still wet magnetic layer, and thus this invention will provide a coating device which, in addition to produce a substrate whose coated surface is high in quality, ensures a good workability, and is excellent in high speed operation.

Examples of this invention have been described above, but those examples can be modified into various forms based on the technical concept underlying those examples without departing from the essence of this invention.

For example, the magnetic field generators 12, 12A and 13 to smoothen a wet coated surface can be placed close to but apart from the non-coated side of substrate 19, or placed so as to make a direct contact with the same side. Or alternatively those magnetic field generators can be placed close to the coated surface of substrate.

Further, although in above examples the magnets 15 constituting the magnetic field generators 12, 12A and 13 are packed together so as to generate a magnetic field F with the same magnetic density throughout their range, but the magnetic field may be varied along the running direction of substrate 19. Namely, flat magnets 12 placed upstream may be packed more coarsely, while those placed downstream are packed more closely, so that the upstream and downstream magnets may exert different magnetic forces around them.

Furthermore, although in above examples a single magnetic field generator or two generators in combination are used, three or more magnetic field generators may be used, and the number of flat magnets 15 is not limited to the range described with respect to above examples. The number of magnetic field generators and the number of magnets contained in individual generators may be varied according to the required properties of a given magnetic recording medium, or to the magnetic or viscous properties of a given magnetic paint, and thus, if, for example, use of a single magnetic field generator brings only a weak effect, use of a plurality of the same generators as in FIG. 6 may bring a desired result.

Still further, the angle the magnetic field generators 12, 12A and 13 takes with respect to the running direction of substrate 19 is not limited to the range described above with respect to present examples, but can take any values as appropriate. For example, the magnetic field generator may be fixed during use, but it may be also so modified as to be rotatable to vary its angle within a certain range during use.

Still further, the configuration and constitution of the magnetic field generators 12, 12A and 13 are not limited to those described above with respect to present examples, but can be modified in any ways as appropriate, ant the same can be said for the configuration and materials of the die 1 and magnetic field generators. The magnet is not limited to permanent magnets but may include electrical magnets. Further, the above-described magnetic field generator 10 may not necessarily be added, but an ordinary extrusion die alone may be used for coating.

This invention is effective not only for the above-described magnetic tapes, but also for all magnetic recording media in the form of tapes, and, in addition, may be also applied for the production of magnetic disks such as floppy disks or the like which are produced after a mother plate has been cut into individual pieces with a specific form, or to magnetic sheets such as magnetic cards.

As set forth above, according to this invention, a magnetic material is extruded with an extrusion die onto a substrate to be coated thereupon, the resulting coat while being still wet is submitted to a smoother which has a laminated structure composed of a plurality of magnets placed obliquely with respect to the running direction of the substrate, the action of magnetic field (magnetic fluxes) from this smoother has a direction obliquely intersecting the running direction of substrate, the coated magnetic material flows in the same direction with that of the action of magnetic field, the thickness of this magnetic coat is flattened through this flow not only in the direction along which the substrate runs, but also in the direction normal to the foregoing direction or in the direction corresponding with the width of substrate. Thus, this invention makes the most of the advantages of high speed coating and others characteristic with extrusion die coating.

Therefore, when this invention is applied to the production of magnetic tapes for video use or audio use, the magnetic layer formed on the surface of tape substrate will have a thickness with practically no irregularities and hence a practically flat surface, and thus will allow the production of good quality magnetic tapes excellent in magnetic properties, magnetoelectric conversion and surface configuration.

What is claimed is:

1. A coating device comprising: an extrusion die to extrude a magnetic material onto a first surface of a substrate running continuously in a first longitudinal axial direction along a first longitudinal axis adjacent said extrusion die so as to coat the first surface; and a smoother to smooth the first surface coated with the magnetic material while the magnetic material is still wet through the action of a magnetic field, said smoother comprising first and second laminated stacks of magnets, each magnet having a north pole and a south pole, said magnets being arranged in each said stack in an alternating manner in the first longitudinal axial direction so that the north pole of a first magnet is adjacent the south pole of a second adjacent magnet, the first and second laminated stacks having a second and a third longitudinal axis, respectively, which are disposed at an angled orientation and in opposite directions with respect to said first longitudinal axis, said smoother being disposed in a plane parallel to and adjacent the substrate on a side opposite the first surface coated with the magnetic material.

2. A device as described in claim 1 wherein the magnetic material is coated on the substrate while the extrusion die is kept apart from the substrate.

3. A coating device comprising an extrusion die to extrude a magnetic material onto a surface of the substrate running continuously in a first longitudinal axial direction along a first longitudinal axis adjacent said extrusion die so as to coat the surface; and first and second smoothers to smooth the surface coated with the magnetic material while the magnetic material is still wet through the action of a magnetic field, said first and second smoothers each comprising a laminated stack of from about 20 to about 100 magnets, each magnet having a north pole and a south pole, said magnets being arranged in said stack in an alternating manner in the first longitudinal axial direction so that the north pole of a first magnet is adjacent the south pole of a second adjacent magnet, the first laminated stack of the first smoother having a second longitudinal axis which is rotated in a clockwise or a counterclockwise direction to an angular orientation of from about 45° to about 85° with respect to said first longitudinal axis, the laminated stack of said second smoother having a third longitudinal axis which is rotated in a clockwise or a counterclockwise direction to an angular orientation of from about 45° to about 85° with respect to said first longitudinal axis, said third longitudinal axis of the second smoother being rotated in a direction opposite to the rotation of the second longitudinal axis of the first smoother, said first and second smoothers being disposed in a plane parallel to and adjacent the substrate on a side opposite the surface coated with the magnetic material, and said second smoother being disposed along the first longitudinal axis spaced downstream from the first smoother which is also disposed along the first longitudinal axis.

4. A coating device as defined in claim 1, wherein said first and said second laminated stacks each comprise from about 20 to about 100 magnets.

5. A coating device as defined in claim 1, wherein the second and the third longitudinal axes are oppositely disposed at an angled orientation of ±45°–85° with respect to the first longitudinal axis.

* * * * *